US008737692B2

(12) United States Patent
Asatani

(10) Patent No.: US 8,737,692 B2
(45) Date of Patent: May 27, 2014

(54) CONTACT STATE ESTIMATING APPARATUS AND TRAJECTORY GENERATION APPARATUS

(75) Inventor: Minami Asatani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 13/604,108

(22) Filed: Sep. 5, 2012

(65) Prior Publication Data

US 2013/0058538 A1 Mar. 7, 2013

(30) Foreign Application Priority Data

Sep. 7, 2011 (JP) .................................. 2011-195227
Jul. 11, 2012 (JP) .................................. 2012-156023

(51) Int. Cl.
*G06F 9/00* (2006.01)

(52) U.S. Cl.
USPC .................. 382/106; 901/1; 901/46; 700/245

(58) Field of Classification Search
USPC .................. 382/100, 106, 108; 901/1, 46, 47; 348/140; 700/245, 248, 258
See application file for complete search history.

(56) References Cited

U.S. PATENT DOCUMENTS 7,337,040 B2 * 2/2008 Takenaka et al. ............. 700/245
2004/0013295 A1 * 1/2004 Sabe et al. .................... 382/153

FOREIGN PATENT DOCUMENTS

JP 2009-107032 5/2009

* cited by examiner

*Primary Examiner* — Shefali Goradia
(74) *Attorney, Agent, or Firm* — Rankin, Hill & Clark LLP

(57) ABSTRACT

A state where at least a part of the virtual object (e.g., a foot of a robot) enters into the actual object (e.g., floor), i.e., a state where at least a part of a plurality of virtual points located on the surface of the virtual object is inside the actual object, can be assumed. At each of the inside and the outside of the actual object, as a virtual point is located at a deeper position inside and away from the surface or the skin part of the actual object and as a coordinate value difference $\Delta Z_i$ is larger, a higher value is calculated for the cost $E_i$ as well. The combination $Z\hat{}$ of coordinate values of virtual points, bringing the total cost $E = \Sigma_i E_i$ closer to an absolute minimum or a local minimum, can be searched.

11 Claims, 13 Drawing Sheets

■ : RIGHT FOOT POSITION/ POSTURE TRAJECTORY
▭ : LEFT FOOT POSITION/ POSTURE TRAJECTORY

■ : RIGHT FOOT POSITION/ POSTURE TRAJECTORY
▭ : LEFT FOOT POSITION/ POSTURE TRAJECTORY

CONTACT STATE ESTIMATING APPARATUS AND TRAJECTORY GENERATION APPARATUS

BACKGROUND OF THE INVENTION

1. Field of the Invention

The present invention relates to an apparatus that estimates a contact state between different objects on the basis of information on a surface shape of each of the different objects, and relates to an apparatus that generates a position/posture trajectory representing a position and a posture of an object in a times series manner on the basis of a result of the estimation.

2. Description of the Related Art

In order to control the posture of a legged mobile robot walking on a bumpy face stably, a method has been proposed of calculating the grounding degree of a foot rear face of the robot with the ground at each of different positions of the foot rear face on the basis of output values of distance sensors provided at the different positions (see Japanese Patent Application Laid-Open No. 2009-107032).

The grounding degree is defined as "0" or a positive small values when a foot (precisely, a rear face of the foot) is not in contact with the ground, and is defined as "1" when the foot is in a sufficient contact with the ground. In a state between them, the grounding degree is defined so as to continuously change between 0 or the small value $\epsilon$ and 1.

SUMMARY OF THE INVENTION

However, since a contact state between a foot and the ground immediately after the floating foot comes into contact with the ground is not estimated, it might be difficult to control the posture of the robot stably in some grounding states after the foot actually comes into contact with the ground.

Thus, it is an object of the present invention to provide an apparatus capable of precisely estimating a future contact state between different objects such as a foot of a legged mobile robot and a floor face and to provide an apparatus that generates, using a result of the estimation, a trajectory to control a position and a posture of an object.

A contact state estimating apparatus of the present invention includes: a distance measurement element which measures a distance to an actual object; a first arithmetic processing element configured to measure a coordinate value of each actual point located on a surface of the actual object in a reference coordinate system on a basis of the distance measured by the distance measurement element; a second arithmetic processing element configured to assume a position and a posture of a virtual object in a designated shape in the reference coordinate system, thereby assuming a coordinate value of each virtual point located on a surface of the virtual object and corresponding to each actual point; and a third arithmetic processing element configured to calculate total cost that is a total value of cost for each combination of the actual point and the virtual point in accordance with a cost function, the cost function having a coordinate value difference as a variable, the coordinate value difference being a difference between a coordinate value of each actual point in the reference coordinate system measured by the first arithmetic processing element and a coordinate value of each virtual point in the reference coordinate system assumed by the second arithmetic processing element, the coordinate value difference being defined as a positive value in the case where the virtual point exists inside the actual object and as a negative value in the case where the virtual point exists outside the actual object, the cost function having an absolute minimum or a local minimum at a predetermined balance value of 0 or more and being defined as an increasing function in a definition area on a positive side of the balance value. In the contact state estimating apparatus, the second arithmetic processing element is configured to search for, as a contact state between a first object corresponding to the virtual object and a second object as the actual object, a combination of coordinate values of the virtual points in the reference coordinate system so that the total cost calculated by the third arithmetic processing element is brought closer to an absolute minimum or a local minimum.

According to the contact state estimating apparatus as a first aspect of the present invention, a state where at least a part of the virtual object enters into the actual object, i.e., a state where at least a part of a plurality of virtual points located on the surface of the virtual object is inside the actual object, can be assumed. At each of the inside and the outside of the actual object, as a virtual point is located at a deeper position inside and away from the surface or the skin part (thickness is proportional to the balance value) of the actual object, a larger positive value can be calculated for the coordinate value difference between the virtual point and the actual point located on the surface of the actual object, and a higher value can be calculated for the cost as well.

Therefore the combination of coordinate values of virtual points that can bring the total cost closer to the absolute minimum or the local minimum can be searched, whereby the virtual point located inside the actual object can be displaced on the surface or at the skin part of the actual object or outside the actual object. Then, with the combination of the coordinate values of the virtual points matching with the coordinate values of the actual points after such displacement, a contact position of the surface of the virtual object with reference to the surface of the actual object can be assumed. Note here that the contact state between one actual object and the other actual object can be represented by at least one of the position, the posture and the area of the contact range of the other object at the surface of the one object, for example.

Thereby a situation such that an infeasible state where the other actual object (the first object) corresponding to the virtual object gets stuck in the one actual object (the second object) as a measurement target of a coordinate value of each actual point without deforming the one actual object (different actual objects occupy a common actual space) is searched as a contact state can be surely avoided. As a result, a future contact state between the one actual object and the other actual object can be estimated precisely. Further, for the estimation of a contact state, an actual point coordinate value only may be measured, and there is no need to measure the posture of the surface of the actual object, and therefore the calculation load can be accordingly reduced. Note here that the virtual object may have a designated shape that can be changed as any shapes such as a plane having a surface on which virtual points are defined as well a curved face in any shape.

Preferably the third arithmetic processing element is configured to calculate the cost for each combination of the actual point and the virtual point using a function as the cost function, the function being defined so that, even in the case of having a same absolute value of a difference from the balance value, a value in the case where a variable value is larger than the balance value is larger than a value in the case where a variable value is smaller than the balance value.

According to the thus configured contact state estimating apparatus, the cost and the total cost are calculated in accordance with the cost function being defined so that, even in the case of having a same absolute value of a difference from the balance value, a value in the case where a variable value is larger than the balance value is larger than a value in the case where a variable value is smaller than the balance value. That is, the cost and the total cost are calculated in accordance with a cost function that is asymmetrical between positive-side and negative-side definition areas sandwiching the balance value. For instance, the cost and the total cost are calculated in accordance with a cost function such that the gradient representing an increase rate in the definition area on the positive side of the balance value becomes shaper than the gradient representing a decrease rate in the definition area on the negative side of the balance value.

Therefore, the combination of coordinate values of the virtual points can be searched for while giving priority to bringing a virtual point located inside an actual object closer to the surface or the skin part of the actual object rather than bringing a virtual point located outside the actual object closer to the surface or the skin part of the actual object. As a result, the aforementioned situation such that an infeasible state is searched for as a contact state between the virtual object and the actual object can be surely avoided. As a result, a future contact state between the one actual object and the other actual object can be estimated precisely.

Preferably, the third arithmetic processing element is configured to calculate the cost for each combination of the actual point and the virtual point using a function as the cost function, the function being defined as a constant value of 0 or more at least in a definition area of a designated value smaller than the balance value in a definition area on a negative side of the balance value.

According to the thus configured contact state estimating apparatus, when the constant value is 0, the cost of a virtual point that is located outside the actual object and is away from the surface of the actual object to some extent can be uniformly estimated as "0". Thereby, the calculation load required for searching processing of a combination of coordinate values of virtual points that brings the total cost closer to the absolute minimum or the local minimum can be reduced. Then, the aforementioned situation such that an infeasible state is searched for as a contact state between the virtual object and the actual object can be surely avoided. As a result, a future contact state between the one actual object and the other actual object can be estimated precisely.

When the constant value is a positive value, the cost of a virtual point that is located outside the actual object and is away from the surface of the actual object to some extent can be uniformly estimated as the positive value. Thereby, even when the surface of the virtual object is away from the surface or the skin part of the one actual object, searching processing for a combination of coordinate values of virtual points so as to bring the total cost closer to the absolute minimum or the local minimum can be promoted. As a result, a future contact state between the one actual object and the other actual object can be estimated precisely and promptly.

Preferably, the second arithmetic processing element is configured to assume each of different combinations of a position and a posture of the virtual object in the reference coordinate system, thereby assuming each combination of coordinate values of the virtual points, and then search for a combination of coordinate values of the virtual points in the reference coordinate system so that the total cost calculated by the third arithmetic processing element is brought closer to an absolute minimum or a local minimum.

According to the thus configured contact state estimating apparatus, in accordance with each of combinations of different initial positions and initial postures of the virtual object, a future plurality of contact states between the one actual object and the other actual object in the same shape as the virtual object can be estimated precisely.

Preferably, the cost function is defined as a product of a coefficient function having the coordinate value difference as a variable and power of a positive value of an absolute value of the coordinate value difference.

According to the thus configured contact state estimating apparatus, the cost can be represented as elastic energy of a virtual spring, where the coefficient function is a spring constant and an absolute value of the coordinate value difference is a deformation amount of the spring.

Preferably, the coefficient function is defined in accordance with an error distribution function of the coordinate value difference to determine a degree of a width in accordance with a degree of measurement accuracy of the distance image sensor, and the coefficient function is defined so that, in the case of the width=0, a value becomes 0 in the case where the coordinate deviation value is 0, whereas as the width becomes larger, the value becomes a larger positive value in the case where the coordinate deviation value is 0.

According to the thus configured contact state estimating apparatus, a situation such that, although the coordinate value difference is originally a positive value, it is determined as a negative value because the measurement accuracy of the distance image sensor is low, resulting in that a contact state between the virtual object and the surface of the actual object is estimated with the virtual point left inside the actual object can be avoided.

Preferably, a difference between a virtual pressing force acting from the virtual object to the actual object and a virtual drag acting from the actual object to the virtual object is defined as a function having the coordinate value difference as a variable and becoming 0 at the balance value, and the cost function is defined as positive power of a magnitude of the difference.

Preferably, the virtual pressing force is defined as a positive or negative constant value, and the virtual drag is defined as a decreasing function having a range of 0 or less or as an increasing function having a range of 0 or more, the function having the coordinate deviation value as a variance.

According to the thus configured contact state estimating apparatus, a contact state between the virtual object and the actual object can be estimated in accordance with a virtual law of action and reaction between the virtual object and the actual object.

A trajectory generation apparatus of the present invention includes the contact state estimating apparatus according to the present invention. The trajectory generation apparatus is configured to select, as a plurality of contact state candidates, a group of contact states among a plurality of contact states between the first object and the second object estimated by the third arithmetic processing element, and then generate a position/posture trajectory representing a position and a posture of the first object in a time series manner so that a contact state is embodied in accordance with the plurality of contact state candidates.

According to the trajectory generation apparatus of the present invention, a position/posture trajectory can be generated so as to embody a contact state estimated precisely as stated above. Therefore, the position and the posture of the first object are controlled in accordance with the trajectory, whereby the first object can be brought into contact with the second object intermittently or continuously in a desired form.

Preferably, in the trajectory generation apparatus of the present invention, a position/posture trajectory at a flooring part of each of a plurality of legs, as the first object, extending from a body of a legged mobile robot is generated so as to avoid mutual interference of the plurality of legs.

Preferably, in the trajectory generation apparatus of the present invention, a position/posture trajectory at a flooring part of each of a plurality of legs, as the first object, extending from a body of a legged mobile robot, is generated so that a posture variation of each of the plurality of legs is within a predetermined permissible range.

DESCRIPTION OF THE PREFERRED EMBODIMENTS (Configuration)

Figure 1:
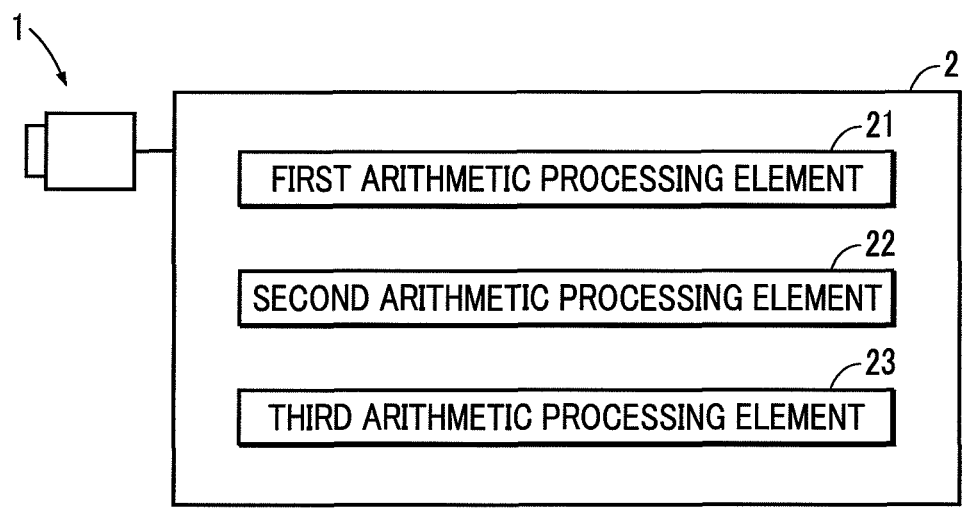
FIG. 1 describes the configuration of a contact state estimating apparatus that is one embodiment of the present invention.

A contact state estimating apparatus illustrated in FIG. 1 includes a distance image sensor (distance measurement element) 1 and a computer (programmable computer) 2 to which an output signal from the distance image sensor 1 is input. The computer 2 includes an arithmetic processing unit (made up of a CPU), a storage device (made up of a memory) and an input/output circuit.

Figure 2:
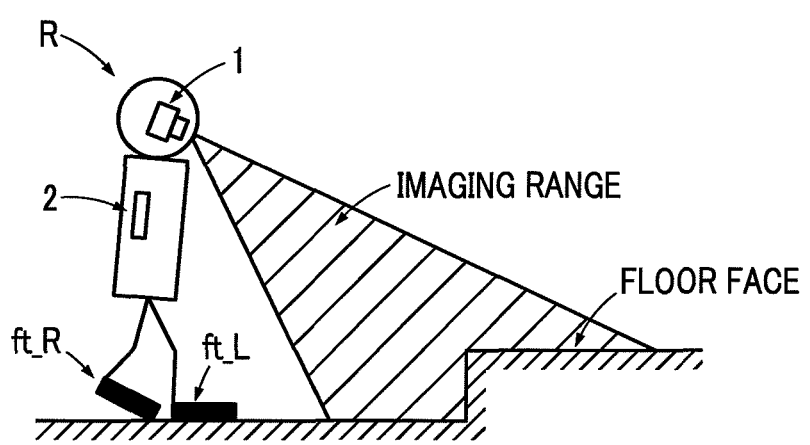
FIG. 2 describes exemplary usage of the contact state estimating apparatus.

The contact state estimating apparatus, for instance, is mounted on a legged mobile robot R as illustrated in FIG. 2, and is used for estimation of a contact state between a part of legs such as a foot ft thereof (when left and right feet are to be distinguished, "R" and "L" are added thereto) and a floor face. The legged mobile robot R may be configured as in the configuration proposed by the present applicant in Japanese Patent No. 3674788, for example. The contact state estimating apparatus further may be used to estimate a contact state between a palm of a robot arm or a part the arm and a target object. The contact state estimating apparatus further may be installed in a vehicle and be used for estimation of a contact state between a tire of the vehicle and a road face.

The distance image sensor 1 may be a Time-of-Flight (TOF) distance image sensor, including pixels each acquiring a distance image having a distance measurement value as a pixel value. The distance image sensor 1 includes a group of imaging elements arranged in a plane, the imaging elements group defining "a distance image coordinate system". The distance image sensor 1 may include a left and right pair of image sensors (stereo camera). Using parallax of the pair of image sensors, a coordinate value of each actual point located on a surface of an actual object (subject) can be measured in a reference coordinate system.

The computer 2 includes a first arithmetic processing element 21, a second arithmetic processing element 22 and a third arithmetic processing element 23, which are configured to execute arithmetic processing described later. A single arithmetic processing unit may function as these three arithmetic processing elements 21 to 23, or a plurality of arithmetic processing units may function as these three arithmetic processing elements 21 to 23 in a coordinated fashion through mutual communication.

Each element being "configured" to execute arithmetic processing in charge means "programming" so that an arithmetic processing unit such as a CPU making up each element reads software as well as necessary information from a memory such as ROM or RAM or a recording medium and executes the arithmetic processing to the information in accordance with the software.

(Functions)

The following describes a contact state estimating method executed by the thus configured contact state estimating apparatus.

Figure 3:
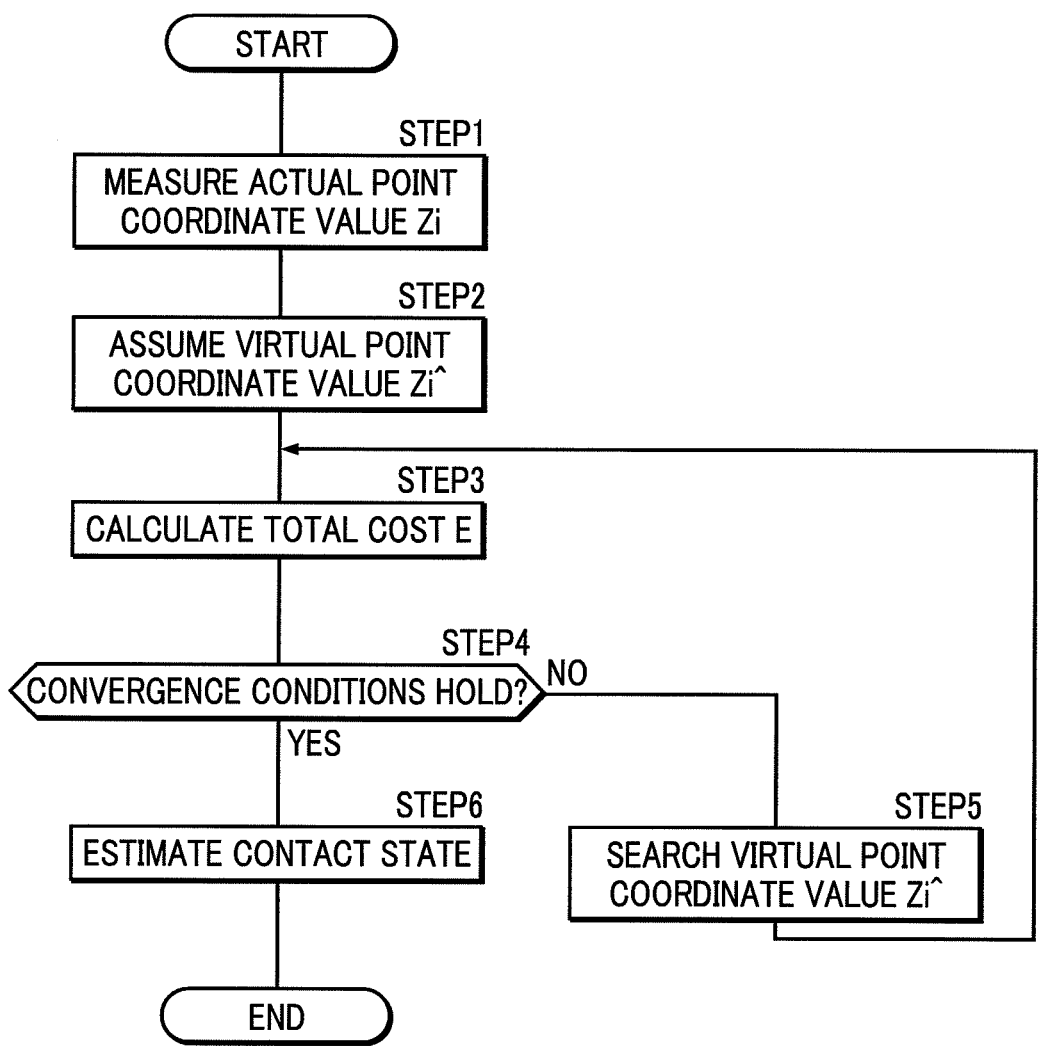
FIG. 3 is a flowchart showing arithmetic processing executed by the contact state estimating apparatus.

The first arithmetic processing element 21 measures a coordinate value of an actual point located on a surface (e.g., a floor face) of a subject as an actual object (FIG. 3/STEP 1).

More specifically, on the basis of an output signal from the distance image sensor 1, a distance z, as a pixel value of an i-th pixel (i=1 to n) making up the distance image coordinate system is measured as an actual point coordinate value (precisely z component). A three-dimensional rectangular coordinate system having z-direction in the direction orthogonal to the two-dimensional distance image coordinate system is used as a reference coordinate system.

Since distance $1$ between the optical center of the distance image sensor 1 and the object surface is measured, a pixel value (z component) of a pixel located at a position forming angle $\psi$ with the optical axis at the distance image is defined as $1 \cos \psi$. Therefore, when the distance image sensor 1 is calibrated, a z-component $z_i$ can be calculated in accordance with the definition.

Note here that, as the reference coordinate system, a robot coordinate system or a world coordinate system may be used. For instance, when the distance image sensor 1 is mounted on the robot R, the position and the posture of the distance image coordinate system with reference to the robot coordinate system is calculated in accordance with a forward kinematic model representing the behavior of the robot R and then is stored in a storage device. The position and posture of the distance image coordinate system with reference to the robot coordinate system is defined by a translational matrix and a rotational matrix or quaternion equivalent to them.

In the robot coordinate system, the mass center (e.g., included in a body) of the robot R is defined as an origin, the upward of the robot R is defined as +x direction, the right direction is defined as +y direction and the forward is defined as +z direction. The position and posture of the robot coordinate system in the world coordinate system is defined by the behavior plan of the robot R stored in the storage device.

A coordinate value in the three-dimensional rectangular coordinate system with reference to the distance image coordinate system undergoes coordinate conversion using the matrix stored in the storage device, whereby a coordinate value in the robot coordinate system can be calculated. A coordinate value in the three-dimensional rectangular coordinate system with reference to the distance image coordinate system undergoes coordinate conversion using the matrix and the behavior plan stored in the storage device, whereby a coordinate value in the world coordinate system can be calculated.

The second arithmetic processing element 22 assumes a coordinate value $z_i\hat{}$ of the i-th assumed point located on a surface of a virtual object in a designated shape (FIG. 3/STEP 2).

More specifically, a reference position $q_i$ of the i-th virtual point of a foot rear face (surface of the virtual object) of the robot R is set, whereby a reference position and a reference posture of the foot rear face in the reference coordinate system are set. When the foot rear face has a planar shape, the reference position $q_i$ is defined by the relational expression (01):

$$q_i={}^t(x_i,y_i,1) \qquad (01),$$

where "$t$" denotes transposition. (xi, yi) represents a pixel position having, as a pixel value, the distance measurement value $z_i$ in the distance image. The area and the shape of the range delimited by the reference position group $Q=(q_1, \ldots q_i, \ldots q_n)$ is determined uniquely in accordance with the area (local area) set so as to cover the area and shape itself of the foot rear face stored in the storage device or the foot rear face as well as the distance.

On the other hand, the reference position and the reference posture of the foot rear face may be changed appropriately. For instance, a predetermined value is uniformly added or subtracted to/from the x component of the reference position $q_i$, whereby the reference position of the foot rear face in the reference coordinate system may be changed by the predetermined value. The x component and y component of the reference position $q_i$ are uniformly multiplied with factors cos θ and sin θ, respectively, representing rotation of a predetermined angle θ around z-axis, whereby the reference posture in the xy plane of the foot rear face can be changed in the reference coordinate system.

Further, a plane parameter $m={}^t(m_x, m_y, m_z)$ is assumed, representing the position and the posture of the foot rear face in the reference coordinate system.

The plane parameter m is defined by the relational expression (011), on the basis of any reference position $q_i$ making up the plane and a distance z thereof:

$$mq_i=z \qquad (011).$$

The plane parameter m is defined by the relational expression (02), on the basis of the shape Q of the foot rear face, the actual point coordinate value group $Z={}^t(z_i, \ldots z_i, \ldots z_n)$ and a n-th unit matrix I:

$$m=(Q^tQ)^{-1}QIZ \qquad (02).$$

Then each component of the vector $Z\hat{}$ calculated by the relational expression (03) is assumed as a virtual point coordinate value $z_i\hat{}$ (precisely, z component):

$$Z\hat{}={}^tQm \qquad (03).$$

Note here that the surface shape of the virtual object can be changed to a plane as well as a curved face in any shape by a user of the apparatus of the present invention. For instance, a curved face parameter $m={}^t(m_{11}, m_{12}, m_{21}, m_{22}, m_3)$ is set, whereby the shape of the virtual object may be set so as to have a curved face represented by the relational expression (022) as the surface thereof:

$$m_{11}x^2+m_{12}x+m_{21}y^2+m_{22}y+m_3z=\alpha \qquad (022).$$

In this case, for instance, a contact state between a palm whose surface shape is represented by the curved face parameter or the relational expression (022) and an object such as a handrail can be estimated.

The third arithmetic processing element 23 calculates cost $E_i$ in accordance with a cost function $E(\Delta z_i)$ on the basis of a coordinate value difference (distance residual) $\Delta z_i=z_i-z_i\hat{}$, and the sum thereof $\Sigma_i E_i$ is calculated as total cost E (FIG. 3/STEP 3). The coordinate value difference $\Delta z_i$ will be a positive value when the virtual point is located outside the actual object or a negative value when the virtual point is located inside the actual object. The cost function $E(\Delta z_i)$ is defined by the relational expression (10) as a product of a coefficient function $w(\Delta z_i)$ having the coordinate value difference $\Delta z_i$ as a variable and the square of the absolute value of the coordinate value difference $\Delta z_i$. Such a number of the power is not limited to "2", but any positive value such as "0.5", "1.5" or "3" may be set:

$$E(\Delta z_i)=w(\Delta z_i)|\Delta z_i|^2 \qquad (10).$$

The calculation procedure of the cost $E_i$ may be selected appropriately. For instance, the cost $E_i$ may be calculated by the cost function $E(\Delta z_i)$ on the basis of the coordinate value difference $\Delta z_i$. A coefficient may be calculated in accordance with a coefficient function $w(\Delta z_i)$ on the basis of the coordinate value difference $\Delta z_i$, and apart from this, the value of the power (square) of the absolute value $|\Delta z_i|$ of the coordinate value difference may be separately calculated, and then such calculation results may be multiplied for the calculation of the cost $E_i$.

The coefficient function $w(\Delta z_i)$ may be defined by the relational expression (12), for example. As indicated with a solid line in FIG. 4(a), the coefficient function $w(\Delta z_i)$ is 0 in the negative definition area ($\Delta Z_i<0$), while being an increasing function of the coordinate value difference $\Delta z_i$ in the definition area of 0 or more:

$$w(\Delta z_i)=0 \text{ (if } \Delta z_i<0), w(\Delta z_i)=c_0\Delta z_i(0<c_0) \text{ (if } 0\leq\Delta z_i) \qquad (12).$$

The coefficient function $w(\Delta z_i)$ may be defined by the relational expression (14), for example. In this case, as indicated with a solid line in FIG. 4(b), the coefficient function $w(\Delta z_i)$ is 0 in the definition area of a negative designated value $-c_2$ ($c_2>0$) or less, while being an increasing function in the definition area exceeding the negative designated value $-c_2$:

$$w(\Delta z_i)=0 \text{ (if } \Delta z_i\leq-c_2), \text{ or } w(\Delta z_i)=(c_1/c_2)\Delta z_i+c_2 \text{ (if } -c_2<\Delta z_i) \qquad (14).$$

The coefficient function $w(\Delta z_i)$ may be defined by the relational expression (16), for example. As indicated with a solid line in FIG. 4(c), the coefficient function $w(\Delta z_i)$ is an increasing function of the coordinate value difference $\Delta z_i$:

$$w(\Delta z_i)=\log(1+\exp(\alpha\Delta z_i-\beta))(\alpha>0,\beta>0) \qquad (16).$$

The coefficient function $w(\Delta z_i)$ may be defined while considering a measurement error of the actual point coordinate value and furthermore an error of the coordinate value difference $\Delta z_i$. For instance, as defined by the relational expression (20), a result of convolution of the original coefficient function $w_o(\Delta z_i)$ and an error distribution function p(t) of the coordinate value difference $\Delta z_i$ may be defined as the coefficient function $w(\Delta z_i)$. The integral interval may be $[-\infty,\Delta z_i]$:

$$w(\Delta z_i)=\int dt\{-w(t-\Delta z_i)\}p(t) \qquad (20).$$

The error distribution function p(t) may be defined by a gauss distribution function (average value m=0) as represented by the relational expression (22), for example. The standard deviation σ may be set beforehand, or after receiving, from the distance image sensor 1, a signal representing measurement accuracy thereof, the standard deviation σ may be set on the basis of the signal:

$$p(t)=1/\{(2\pi)^{1/2}\sigma\}\exp\{-t^2/2\sigma^2\} \qquad (22).$$

Figure 4:
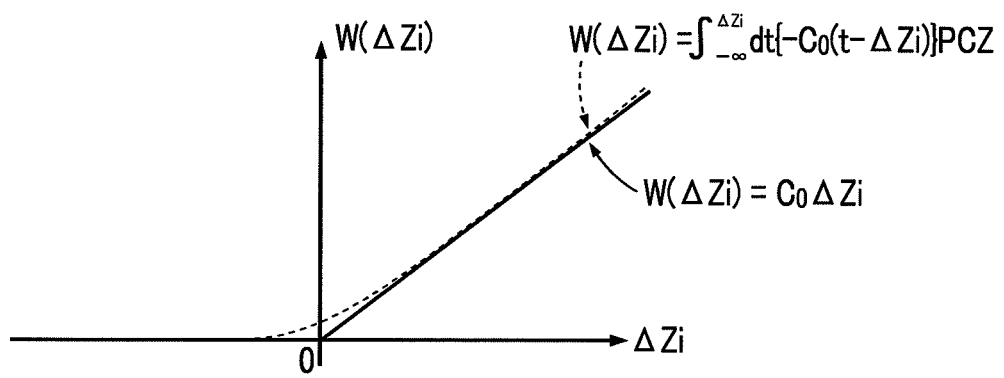
FIG. 4 describes definition of a coefficient function.
Figure 4:
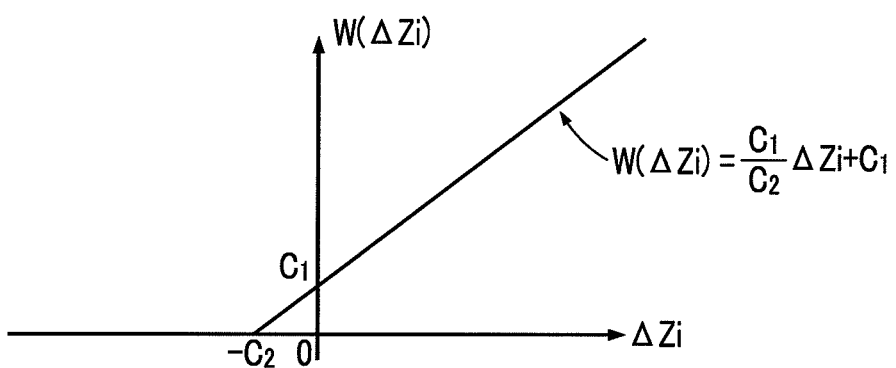
Figure 4:
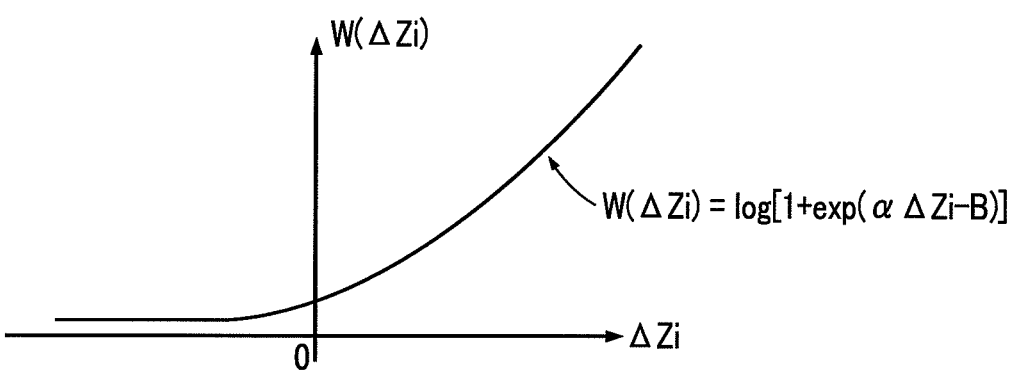

When the original coefficient function $w_o(\Delta z_i)$ is defined by the relational expression (12), the coefficient function $w(\Delta z_i)$ will show a change characteristic as indicated with the broken line in FIG. 4(a). As can be seen, this coefficient function $w(\Delta z_i)$ agrees with the original coefficient function $w_o(\Delta z_i)$ (see the solid line) in that they are increasing functions in the definition area of 0 or more, but is different in that it remains an increasing function even in the negative definition area around 0, and has a positive value and not 0 at $\Delta z_i$=0.

It can be said that the coefficient function $w(\Delta z_i)$ indicated with the solid lines in FIGS. 4(b)(c) have a change characteristic, approximately representing the change characteristic of the coefficient function $w(\Delta z_i)$ indicated with the broken line in FIG. 4(a).

Figure 5:
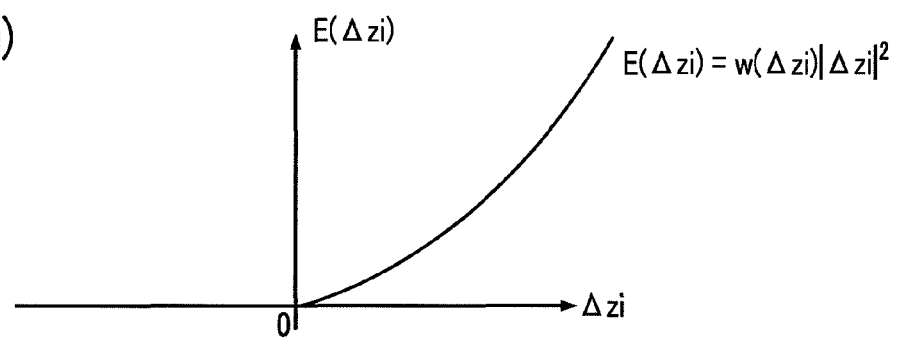
FIG. 5 describes definition of a cost function.
Figure 5:
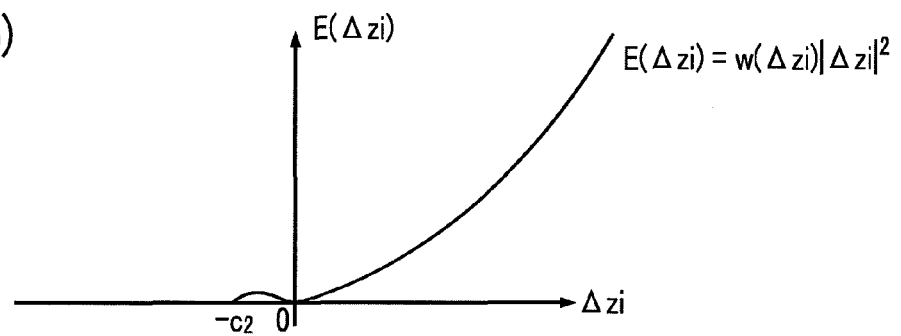
Figure 5:
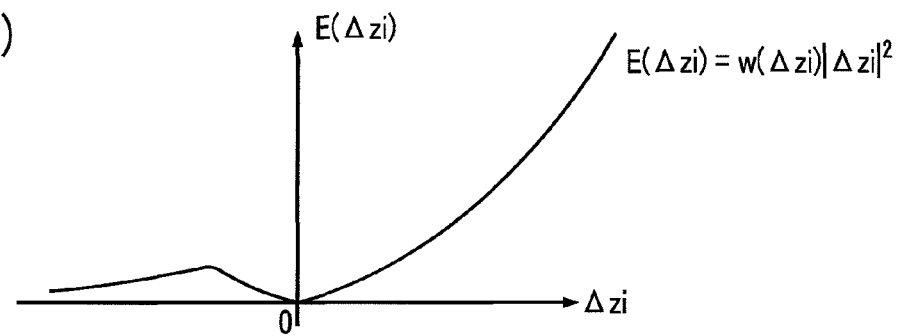
Figure 5:
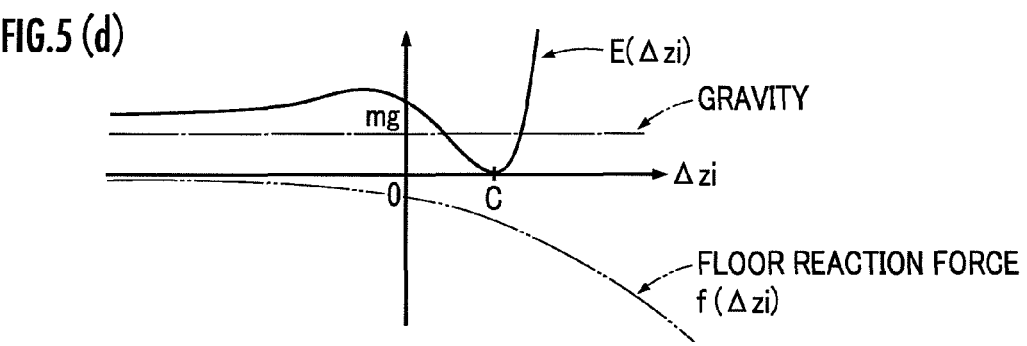

When the coefficient function $w(\Delta z_i)$ is defined by the relational expression (12), as illustrated in FIG. 5(a), the cost function $E(\Delta z_i)$ will be 0 in the negative definition area (definition area on the negative side in the case of balance value=0), whereas it will be an increasing function in the positive definition area (definition area on the positive side in the case of balance value=0). Further the cost function $E(\Delta z_i)$ shows an asymmetric change characteristic in the positive and negative definition areas. That is, even when variables $\Delta z_i$ have the same absolute value, the value of the cost function $E(\Delta z_i)$ will be larger when the variable $\Delta z_i$ is a positive value than when the variable $\Delta z_i$ is a negative value.

When the coefficient function $w(\Delta z_i)$ is defined by the relational expression (14), as illustrated in FIG. 5(b), the cost function $E(\Delta z_i)$ has a local minimum 0 at $\Delta z_i$=0 (balance value) and is an increasing function in the positive definition area. Thereby, when $\Delta z_i$ is around 0, $\Delta z_i$ tends to be closer to 0. The cost function $E(\Delta z_i)$ shows an asymmetric change characteristic in the positive and negative definition areas, and is 0 in the definition area of a negative designated value $-c_2$ ($\Delta z_i \leq -c_2$) or less. That is, even when variables $\Delta z_i$ have the same absolute value, the value of the cost function $E(\Delta z_i)$ will be larger when the variable $\Delta z_i$ is a positive value than when the variable $\Delta z_i$ is a negative value.

When the coefficient function $w(\Delta z_i)$ is defined by the relational expression (16), as illustrated in FIG. 5(c), the cost function $E(\Delta z_i)$ has a local minimum 0 at $\Delta z_i$=0 (balance value) and is an increasing function in the positive definition area. The cost function $E(\Delta z_i)$ shows an asymmetric change characteristic in the positive and negative definition areas.

When the coefficient function $w(\Delta z_i)$ is defined by the relational expression (20) and the original coefficient function $w_o(\Delta z_i)$ is defined by the relational expression (12), the cost function $E(\Delta z_i)$ shows a change characteristic similar to that shown in FIG. 5(b).

The cost $E_i$ is proportional to the square of the absolute value of the coordinate value difference $\Delta z_i$ that is a distance residual between the actual point and the virtual point in the z-direction of the reference coordinate system (see the relational expression (08)). Therefore, the cost $E_i$ corresponds to elastic energy of a virtual spring illustrated in FIG. 6, bringing a virtual point to an actual point, where the coefficient function $w(\Delta z_i)$ is a spring constant.

As represented by each of the relational expressions (101) to (104), the cost function $E(\Delta z_i)$ can be defined in various forms, showing an absolute minimum or a local minimum at $\Delta z_i$=0 and being an increasing function in the positive definition area:

$$w(\Delta z_i)=0 \text{ (if } \Delta z_i<0), E(\Delta z_i)=(\Delta z_i)^2 \text{ (if } 0\leq \Delta z_i) \quad (101);$$

$$E(\Delta z_i)=\exp(\alpha \Delta zi)(\Delta zi)^2 \quad (102);$$

$$E(\Delta z_i)=-c_1\Delta zi \text{ (if } \Delta zi\leq 0), \text{ or } E(\Delta z_i)=c_1\Delta zi \text{ (if } 0<\Delta zi) \quad (103);$$

$$E(\Delta z_i)=\epsilon(\geq 0) \text{ (if } \Delta zi<0), \text{ or } E(\Delta z_i)=\epsilon+c_1(\Delta zi)^2 \text{ (if } 0<\Delta zi) \quad (104).$$

A virtual floor reaction force function $f(\Delta z_i)$ to determine a virtual drag (virtual floor reaction force) acting from the floor to a foot ft may be defined by the relational expression (105), and the cost function $E(\Delta z_i)$ may be defined by the relational expression (106) on the basis of the virtual floor reaction force function $f(\Delta z_i)$ and a virtual tread force (virtual pressing force) acting from the foot ft to the floor or the gravity mg acting on the foot ft. "m" means a part or all of the mass of the robot R including the foot ft. "g" denotes a gravity acceleration:

$$f(\Delta z_i)=-\log(1+\exp(\alpha\Delta z_i-\beta))(\alpha>0,\beta>0) \quad (105);$$

$$E=(mg-\Sigma i f(\Delta zi))^2 \quad (106).$$

For instance, when the virtual floor reaction force function $f(\Delta z_i)$ is defined by the relational expression (105), as illustrated in FIG. 5(d), the cost function $E(\Delta z_i)$ will be a function such that it shows a local minimum 0 at $\Delta z_i$=c(>0) (balance value) where the gravity acting on the robot R and the virtual floor reaction force are balanced, and increases in the positive-side definition area (c<$\Delta z_i$) of the balance value c.

Considering one or both of the virtual object (foot ft of the robot R) and the actual object (floor) being deformable by a contact, the balance value is set at a positive value. Therefore, a positive balance value c does not mean that estimation of a contact state between the objects where the virtual object partially enters into the actual object without involving deformation of the virtual object is permissible.

As one or both of contact parts (bottom of the foot ft and the floor) between the virtual object and the actual object has higher flexibility, the balance value can be set larger. For instance, when the virtual object partially exists at a skin part of the actual object, an estimated contact state may be such that the part of the virtual object is deformed so as to be along the surface shape of the actual object or the actual object is deformed so as to be along the surface shape of the part of the virtual object.

The second arithmetic processing element 22 determines whether convergence conditions hold or not (FIG. 3/STEP4). The convergence conditions used may include the total cost E being a predetermined threshold or less, the change amount of the total cost E before and after updating being a threshold or less, a difference of the value ($\partial E/\partial m$) this time from the last value being a threshold or less and the like.

When it is determined that the convergence conditions do not hold (FIG. 3/STEP 4 . . . NO), the second arithmetic processing element 22 searches for a coordinate value $z_i\hat{}$ of a virtual point so that the total cost E is brought closer to the absolute minimum or the local minimum (FIG. 3/STEP 5). More specifically, the plane parameter m is calculated by the least squares method (weighted least squares method).

When it is determined that the convergence conditions hold (FIG. 3/STEP 4 . . . YES), the second arithmetic processing element 22 estimates a contact state between the actual object and another actual object having a surface in the same shape as that of the virtual object on the basis of the coordinate value $z_i\hat{}$ of the virtual point at that stage (FIG. 3/STEP 6).

(Operations and Effects)

According to the contact state estimating apparatus exerting the aforementioned functions, a state, which is infeasible if a virtual object is an actual object, where the virtual object (e.g., a foot ft of the robot R) and an actual object (e.g., floor) concurrently occupy a common actual space can be assumed. That is, a state where at least a part of a plurality of virtual points located on a surface of the virtual object is inside the actual object can be assumed (see FIG. 6).

At each of the inside and the outside of the actual object, as a virtual point is located at a deeper position inside and away from the surface or the skin part of the actual object, a larger positive value is calculated for the coordinate value difference $\Delta z_i$ between the virtual point and the actual point located on the surface of the actual object, and a higher value is calculated for the cost $E_i$ as well (see FIGS. 5(a) to (d)). The skin part is defined so that as the balance value becomes larger, the skin part becomes thicker.

Figure 7:
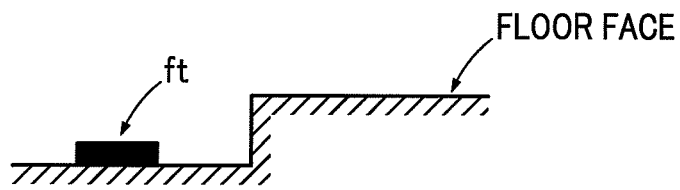
FIG. 7 describes an estimation result of a contact state.
Figure 7:
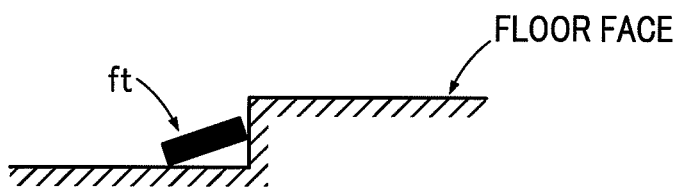
Figure 7:
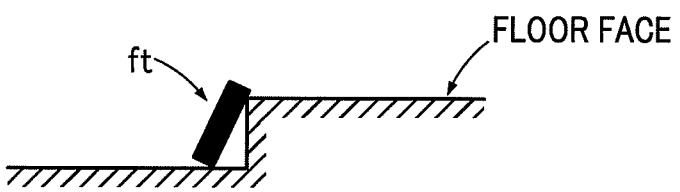
Figure 7:
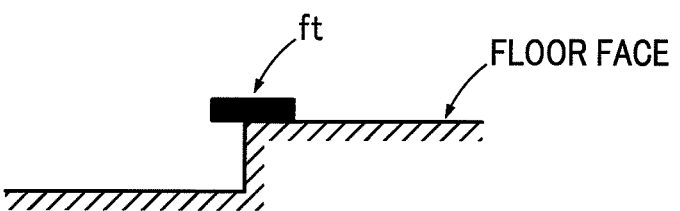
Figure 8:
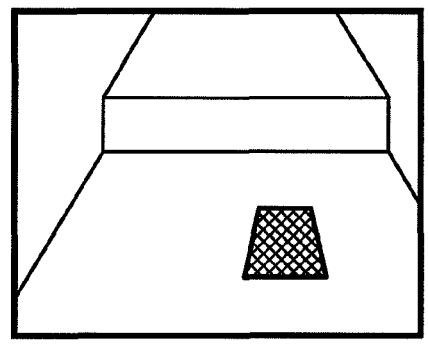
FIG. 8 describes an estimation result of a contact state.
Figure 8:
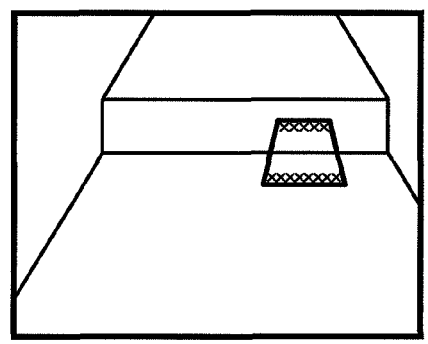
Figure 8:
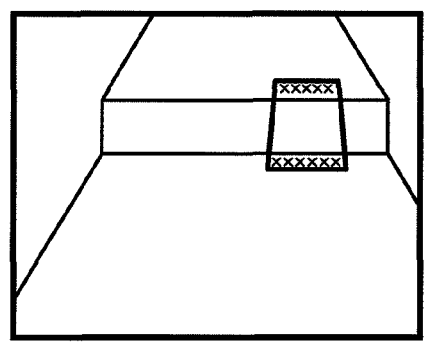
Figure 8:
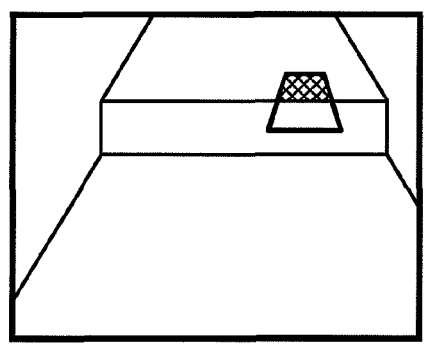

Therefore the plane parameter m that can bring the total cost $E=\Sigma_i E_i$ closer to the absolute minimum (or the local minimum) and furthermore the combination $Z^{\wedge}$ of coordinate values of the virtual points represented by the plane parameter m can be searched, whereby the virtual point located inside the actual object can be displaced outside the actual object, or on the surface or at the skin part thereof, and after such displacement, with the combination of the coordinate values of the virtual points on the surface of the actual object or at the skin part of the actual object, a contact position of a surface of the virtual object with reference to a surface of one actual object can be decided (see FIG. 7 and FIG. 8).

Using the coefficient function $w(\Delta z_i)$ defined by the relational expression (14), the cost E, of a virtual point that is located outside the actual object and is away from the surface of the actual object to some extent can be uniformly estimated as "0" (see FIG. 5(b)). Thereby, the calculation load required for searching processing of a combination of coordinate values of virtual points that brings the total cost closer to the absolute minimum or the local minimum can be reduced.

Using the coefficient function $w(\Delta z_i)$ defined by the relational expression (16), the cost $E_i$ and the total cost E can be calculated in accordance with a cost function $E(\Delta z_i)$ that is asymmetrical in the positive and negative definition areas so that the gradient representing an increase rate in the positive definition area becomes shaper than the gradient representing a decrease rate in the negative definition area (see FIG. 5(c)). Therefore, the combination of coordinate values of each virtual point can be searched while giving priority to bringing a virtual point located inside the actual object closer to the surface of the actual object rather than bringing a virtual point located outside the actual object closer to the surface of the actual object.

The coefficient function $w(\Delta z_i)$ is defined as a result of convolution of an error distribution function p(t) to determine the degree of the width (magnitude of standard deviation $\sigma$) in accordance with the degree of measurement accuracy of the distance image sensor 1 and the original coefficient function $w_o(\Delta z_i)$ (see relational expressions (20) (22)). That is, coefficient function $w(\Delta z_i)$ is defined so that, in the case of the width $\sigma=0$, the value w(0) becomes 0 when the coordinate deviation value $\Delta z_i$ is 0, whereas as the width $\sigma$ becomes larger, the value w(0) becomes a larger positive value when the coordinate deviation value $\Delta z_i$ is 0.

Thereby a situation such that, although the coordinate value difference $\Delta z_i$ is originally a positive value, it is determined as a negative value because the measurement accuracy of the distance image sensor 1 is low, resulting in that a contact state between a virtual object and an actual object is estimated with the virtual point left inside the actual object, can be avoided.

The negative designated value $-c_2$ in the relational expression (14) or values of coefficients $\alpha$ and $\beta$ in the relational expression (16) may be set so as to approximately express the coefficient function $w(\Delta z_i)$ obtained by the convolution. As a result, a situation such that a contact state between a virtual object and an actual object is estimated with the virtual point left inside the actual object can be avoided, which similarly results from the measurement accuracy of the distance image sensor 1.

Figure 6:
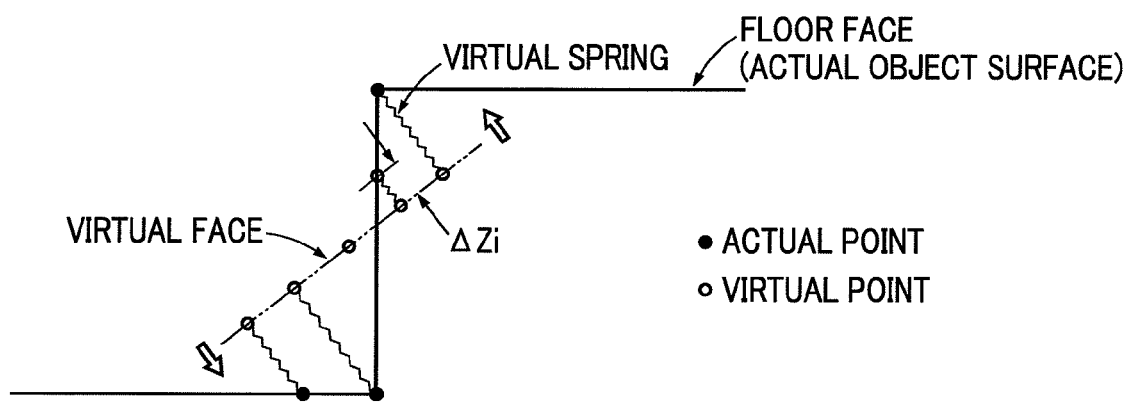
FIG. 6 describes meaning of cost.

Then, a situation such that another actual object corresponding to the virtual object gets stuck in one actual object as a measurement target of a coordinate value of each actual point without deforming the one actual object is searched for as a contact state can be surely avoided (see FIG. 6). That is, a situation such that an infeasible state of the one actual object and the other actual object concurrently occupying a common actual space is searched can be surely avoided. The other actual object corresponding to the virtual object means an actual object having a surface of the same shape and size of those of the virtual object or capable of forming such a surface adaptively. As a result, a future contact state between the one actual object and the other actual object can be estimated precisely.

For instance, as illustrated in each of FIGS. 7(a) to (d), a contact state where the foot rear face comes into contact with the floor face is estimated as a future contact state between the foot rear face and the floor face. FIGS. 8(a) to (d) illustrate distance images where the contact state illustrated in FIGS. 7(a) to (d) are embodied.

Further, for the estimation of a contact state, an actual point coordinate value only may be measured, and there is no need to measure the posture of the surface of the actual object, and therefore the calculation load can be accordingly reduced.

Other Embodiments of the Present Invention

The coefficient function $w(\Delta z_i)$ defined by the relational expression (14) may be not 0 but a positive value in the definition area of the negative designated value $-c_2$ ($c_2>0$) or less. In this case, the cost of a virtual point that is located outside the actual object and is away from the surface of the actual object to some extent can be uniformly estimated as the positive value. Thereby, even when the surface of the virtual object is away from the surface of the one actual object, searching processing for a combination of coordinate values of virtual points so as to bring the total cost closer to the absolute minimum or the local minimum can be promoted. As a result, a future contact state between the one actual object and the other actual object can be estimated precisely and promptly.

Further, a plurality of combinations of the reference position and the reference posture of the foot rear face and the plane parameter or the curved face parameter may be assumed, and in accordance with each of the combinations, a plurality of future contact states between the actual object and the other actual object corresponding to the virtual object may be estimated.

(Trajectory Generation on the Basis of the Estimation Result of a Contact State)

Figure 13:
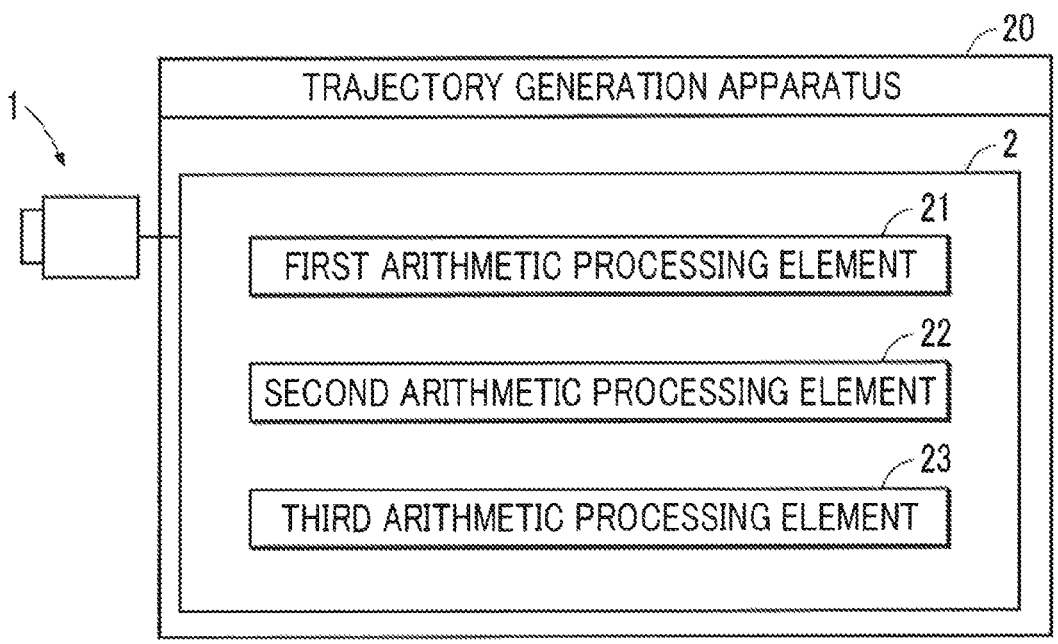
FIG. 13 describes the configuration of a trajectory generation apparatus including a contact state estimating apparatus that is one embodiment of the present invention.

A trajectory generation apparatus 20, shown in FIG. 13, may be configured to generate a position/posture trajectory of a first object using the thus configured contact state estimating apparatus. Among estimated contact states gstk (k=1, 2, . . . ) of the first object with reference to a second object, a group of estimated contact states at a local area that are spatially discrete or continuous (semi-continuous) is selected as contact state candidates gcdj (j=1, 2, . . . ). On the basis of the thus selected contact state candidates gcdj, a position/posture trajectory representing positions and postures of the first object in a time series manner is generated.

Figure 9:
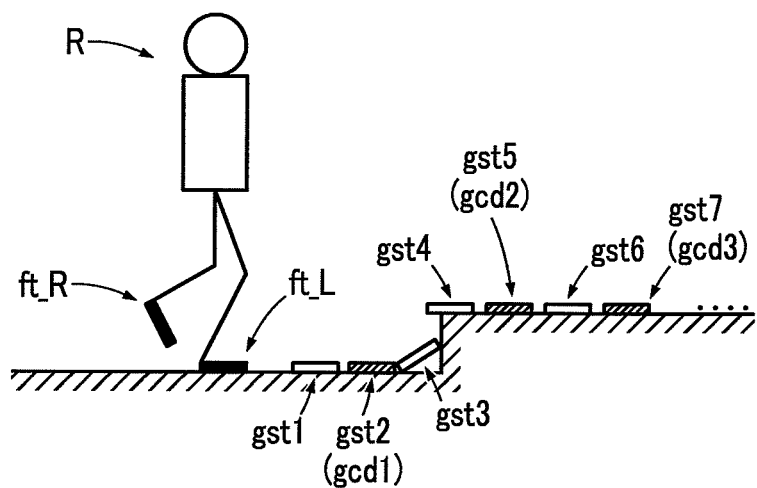
FIG. 9 describes generation of a contact state trajectory based on an estimated contact state.
Figure 9:
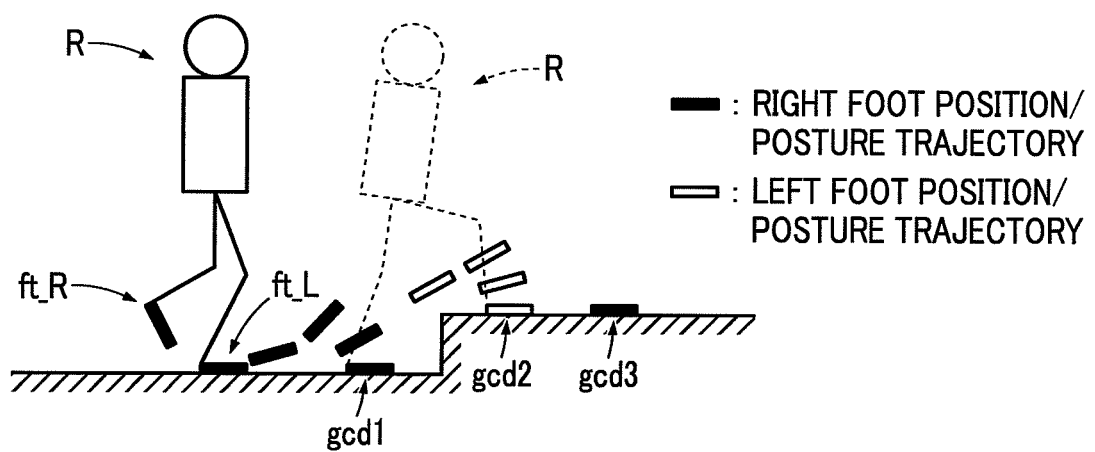

For instance, as illustrated in FIG. 9(a), contact states gst1 to gst7 at a plurality of local areas between both foots ft (first object) of the robot R (see FIG. 2) and the floor (second object) are estimated as stated above. Further, among the estimated contact states gst1 to gst7 at a plurality of local areas, the estimated contact states gst2, gst5 and gst7 at a group of spatially discrete local areas are selected as a plurality of contact state candidates gcd1 to gcd3 (see the shaded portion).

A contact state candidate gcdj is selected so that a first condition holds, the first condition being that both legs of the robot R do not interfere with each other. As a method of avoiding the interference of the both legs, a method described in Japanese Patent No. 4225969 may be used.

Additionally an estimated contact state gstk where a contact range between the foot ft of a free leg and the floor is outside a predetermined range including the foot ft of a supporting leg is selected as a contact state candidate gstj of the free leg. The predetermined range used may be a range included in a three-dimensional space in any shape such as a sphere having, as a center, the center of the foot ft of the supporting leg or a point deviated from the center to the front, rear, left and right. When the right foot ft_R is the foot on the supporting leg side, a range included in a sphere or the like having, as a center, a point deviated from the center of the right foot ft_R to the right or diagonally forward right may be defined as the predetermined range. When the left foot ft_L is the foot on the supporting leg side, a range included in a sphere or the like having, as a center, a point deviated from the center of the left foot ft_L to the left or diagonally forward left may be defined as the predetermined range.

When a plurality of position/posture trajectories are generated for the first object, the position and the posture of the first object may be controlled in accordance with one position/posture trajectory where a second condition holds, the second condition being that a posture change defined by a joint angle variation of each leg is within a predetermined permissible range.

Then, as illustrated in FIG. 9(b), a position/posture trajectory of the right foot ft_R (see black rectangle) and a position/posture trajectory of the left foot ft_L (see white rectangle) are generated so that a contact state corresponding to the contact state candidates gcd1 to gcd3 can be embodied. When a plurality of position/posture trajectories are generated for each foot ft, one position/posture trajectory is selected so that physical constrained conditions such as a variable range of a leg joint angle and a stride of the robot R hold. Based on that, the operation of the legs or the like of the robot R is controlled so that a contact state between each foot ft and the floor face can be embodied in accordance with the one position/posture trajectory.

Figure 10:
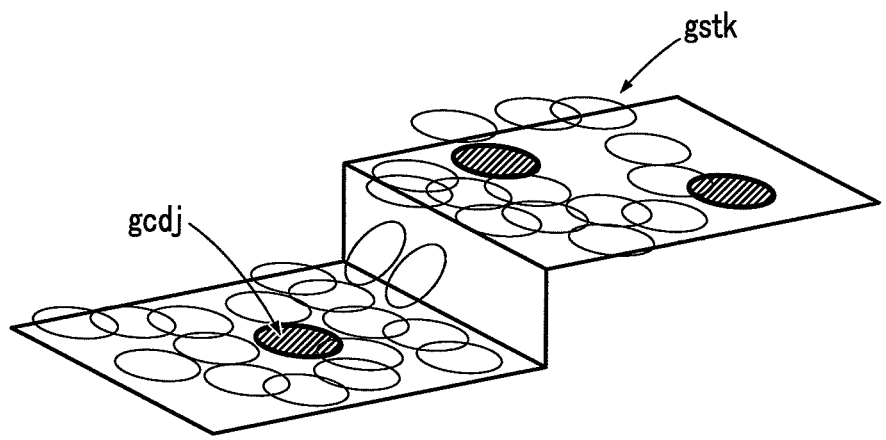
FIG. 10 describes generation of an estimated contact state and contact state candidates.
Figure 10:
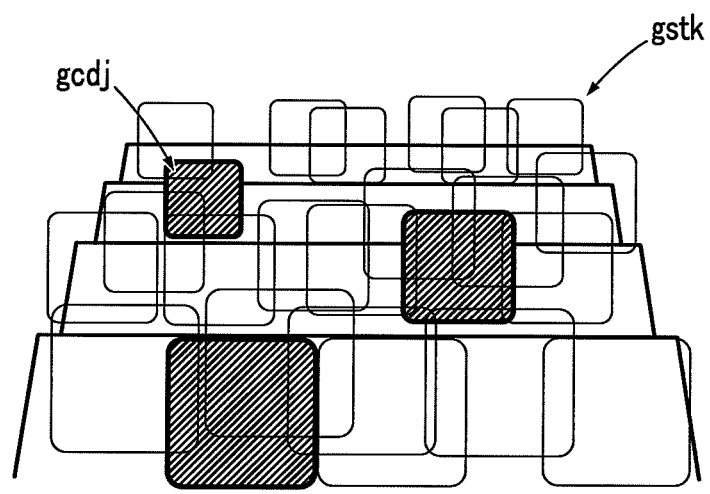

FIG. 10(a) illustrates an estimated contact state gstk and a contact state candidate gcdj (see the shaded portions) between each foot ft of the robot R and the floor having an ascending step height at a local area. FIG. 10(b) illustrates an estimated contact state gstk and a contact state candidate gcdj (see the shaded portions) between each foot ft of the robot R and the floor having a descending step height at a local area. A contact state between the foot ft and the floor in accordance with the estimated contact state gstk is indicated with an ellipse or a rectangle. As illustrated in FIGS. 10(a)(b), estimate contact ranges in accordance with each estimated contact state gstk on the floor face may overlap with each other.

(Imaging Range Adjustment)

Figure 11:
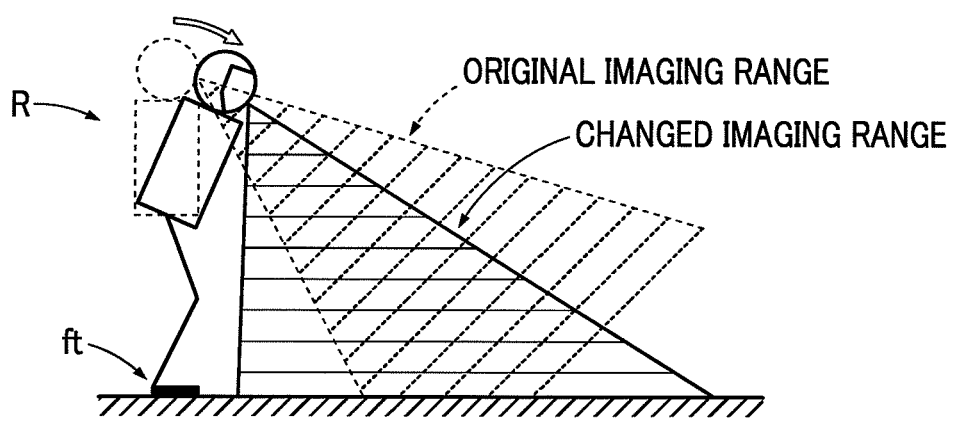
FIG. 11 describes adjustment of an imaging range.

In order to change or expand a contact state estimating range, one or both of the position and the posture of the distance image sensor 1 may be changed, whereby its imaging range may be changed. For instance, as illustrated in FIG. 11, the robot R on the head of which the distance image sensor 1 is mounted leans its body forward (see white arrow). Thereby the imaging range is adjusted so as to include an area (foot area) closer to the robot R than from the original imaging range (see dotted line) (see the shaded portion).

Figure 12:
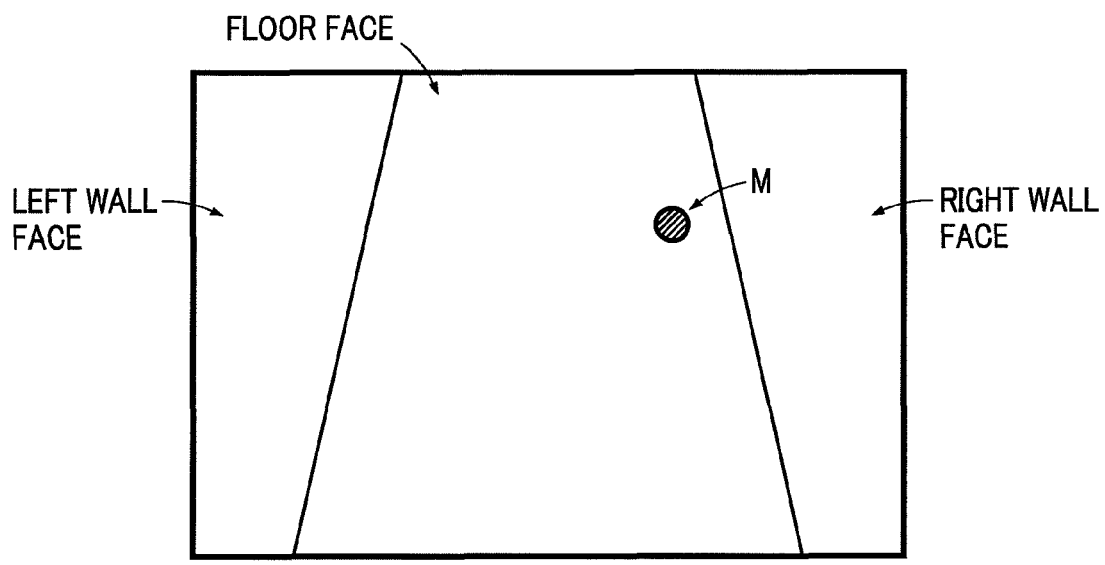
FIG. 12 describes an adjustment result of the imaging range.
Figure 12:
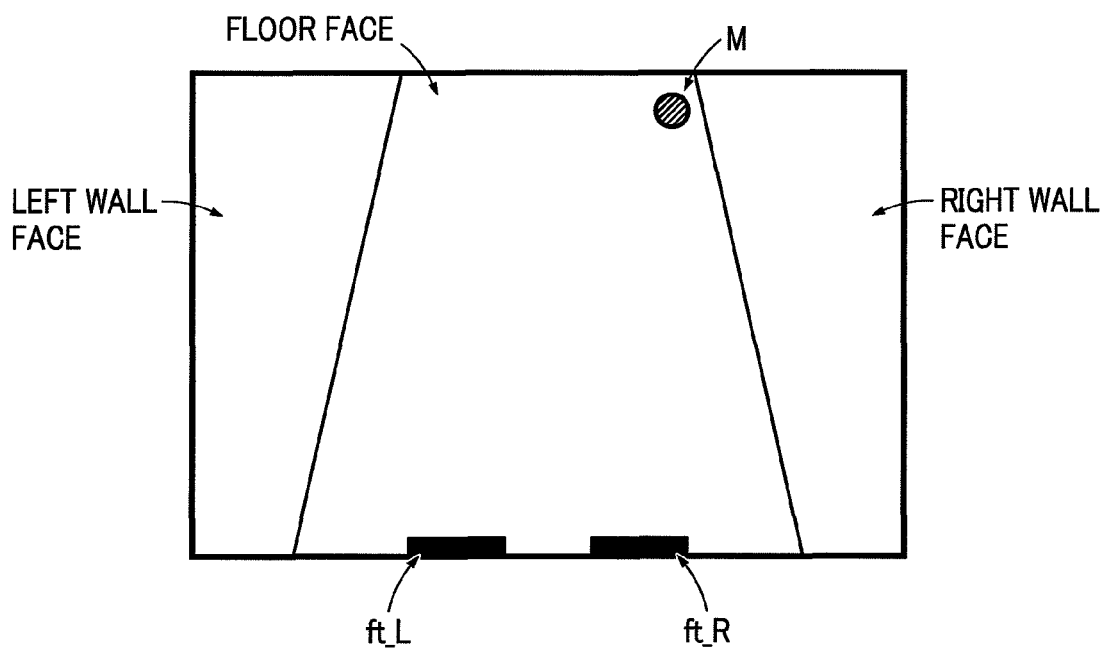

FIG. 12(a) illustrates an image taken by the distance image sensor 1 before the robot R leans its body forward. FIG. 12(b) illustrates an image taken by the distance image sensor 1 after the robot R leans its body forward. The image after leaning the body forward (FIG. 12(b)) includes, at a lower part thereof, a forward end part (toe part) of each foot ft_L and ft_R, which are not included in the image (FIG. 12(a)) before leaning the body forward. Before and after the leaning of the body, the position of mark M given to the floor face is changed in the image.

What is claimed is:

1. A contact state estimating apparatus comprising:
a distance measurement element which measures a distance to an actual object;
a first arithmetic processing element configured to measure a coordinate value of each actual point located on a surface of the actual object in a reference coordinate system on a basis of the distance measured by the distance measurement element;
a second arithmetic processing element configured to assume a position and a posture of a virtual object in a designated shape in the reference coordinate system, thereby assuming a coordinate value of each virtual point located on a surface of the virtual object and corresponding to each actual point; and
a third arithmetic processing element configured to calculate total cost that is a total value of cost for each combination of the actual point and the virtual point in accordance with a cost function, the cost function having a coordinate value difference as a variable, the coordinate value difference being a difference between a coordinate value of each actual point in the reference coordinate system measured by the first arithmetic processing element and a coordinate value of each virtual point in the reference coordinate system assumed by the second arithmetic processing element, the coordinate value difference being defined as a positive value in the case where the virtual point exists inside the actual object and as a negative value in the case where the virtual point exists outside the actual object, the cost function having an absolute minimum or a local minimum at a predetermined balance value of zero or more and being defined as an increasing function in a definition area on a positive side of the balance value,
wherein
the second arithmetic processing element is configured to search for, as a contact state between a first object corresponding to the virtual object and a second object as the actual object, a combination of coordinate values of the virtual points in the reference coordinate system so that the total cost calculated by the third arithmetic processing element is brought closer to an absolute minimum or a local minimum.

2. The contact state estimating apparatus according to claim 1, wherein
the third arithmetic processing element is configured to calculate the cost for each combination of the actual point and the virtual point using a function as the cost function, the function being defined so that, even in the case of having a same absolute value of a difference from the balance value, a value in the case where a variable value is larger than the balance value is larger than a value in the case where a variable value is smaller than the balance value.

3. The contact state estimating apparatus according to claim 1, wherein
the third arithmetic processing element is configured to calculate the cost for each combination of the actual point and the virtual point using a function as the cost function, the function being defined as a constant value of zero or more at least in a definition area of a designated value smaller than the balance value in a definition area on a negative side of the balance value.

4. The contact state estimating apparatus according to claim 1, wherein
the second arithmetic processing element is configured to assume each of different combinations of a position and a posture of the virtual object in the reference coordinate system, thereby assuming each combination of coordinate values of the virtual points, and then search for a combination of coordinate values of the virtual points in the reference coordinate system so that the total cost calculated by the third arithmetic processing element is brought closer to an absolute minimum or a local minimum.

5. The contact state estimating apparatus according to claim 1, wherein
the cost function is defined as a product of a coefficient function having the coordinate value difference as a variable and power of a positive value of an absolute value of the coordinate value difference.

6. The contact state estimating apparatus according to claim 5, wherein
the coefficient function is defined in accordance with an error distribution function of the coordinate value difference to determine a degree of a width in accordance with a degree of measurement accuracy of the distance image sensor, and the coefficient function is defined so that, in the case of the width equals zero, a value becomes zero in the case where the coordinate deviation value is zero, whereas as the width becomes larger, the value becomes a larger positive value in the case where the coordinate deviation value is zero.

7. The contact state estimating apparatus according to claim 1, wherein
a difference between a virtual pressing force acting from the virtual object to the actual object and a virtual drag acting from the actual object to the virtual object is defined as a function having the coordinate value difference as a variable and becoming zero at the balance value, and the cost function is defined as positive power of a magnitude of the difference.

8. The contact state estimating apparatus according to claim 7, wherein
the virtual pressing force is defined as a positive or negative constant value, and the virtual drag is defined as a decreasing function having a range of zero or less or as an increasing function having a range of zero or more, the function having the coordinate deviation value as a variance.

9. A trajectory generation apparatus, comprising a contact state estimating apparatus comprising:
a distance measurement element which measures a distance to an actual object;

a first arithmetic processing element configured to measure a coordinate value of each actual point located on a surface of the actual object in a reference coordinate system on a basis of the distance measured by the distance measurement element;
a second arithmetic processing element configured to assume a position and a posture of a virtual object in a designated shape in the reference coordinate system, thereby assuming a coordinate value of each virtual point located on a surface of the virtual object and corresponding to each actual point; and
a third arithmetic processing element configured to calculate total cost that is a total value of cost for each combination of the actual point and the virtual point in accordance with a cost function, the cost function having a coordinate value difference as a variable, the coordinate value difference being a difference between a coordinate value of each actual point in the reference coordinate system measured by the first arithmetic processing element and a coordinate value of each virtual point in the reference coordinate system assumed by the second arithmetic processing element, the coordinate value difference being defined as a positive value in the case where the virtual point exists inside the actual object and as a negative value in the case where the virtual point exists outside the actual object, the cost function having an absolute minimum or a local minimum at a predetermined balance value of zero or more and being defined as an increasing function in a definition area on a positive side of the balance value,
wherein
the second arithmetic processing element is configured to search for, as a contact state between a first object corresponding to the virtual object and a second object as the actual object, a combination of coordinate values of the virtual points in the reference coordinate system so that the total cost calculated by the third arithmetic processing element is brought closer to an absolute minimum or a local minimum, and
wherein
the trajectory generation apparatus is configured to select, as a plurality of contact state candidates, a group of contact states among contact states at a plurality of local areas between the first object and the second object estimated by the third arithmetic processing element, and then generate a position/posture trajectory representing a position and a posture of the first object in a time series manner so that a contact state is embodied in accordance with the plurality of contact state candidates.

10. The trajectory generation apparatus according to claim 9, wherein
a position/posture trajectory at a flooring part of each of a plurality of legs, as the first object, extending from a body of a legged mobile robot is generated so as to avoid mutual interference of the plurality of legs.

11. The trajectory generation apparatus according to claim 9, wherein
a position/posture trajectory at a flooring part of each of a plurality of legs, as the first object, extending from a body of a legged mobile robot is generated so that a posture variation of each of the plurality of legs is within a predetermined permissible range.

* * * * *